(12) United States Patent
Leyk et al.

(10) Patent No.: US 7,253,592 B2
(45) Date of Patent: *Aug. 7, 2007

(54) DC VOLTAGE CONVERTER AND METHOD FOR CONVERTING A DC VOLTAGE

(75) Inventors: Andreas Leyk, Dinslaken (DE); Christian Kranz, Ratingen Lintorf (DE)

(73) Assignee: Infineon Technologies AG, Munich (DE)

(*) Notice: Subject to any disclaimer, the term of this patent is extended or adjusted under 35 U.S.C. 154(b) by 0 days.

This patent is subject to a terminal disclaimer.

(21) Appl. No.: 11/170,527

(22) Filed: Jun. 29, 2005

(65) Prior Publication Data

US 2006/0007618 A1 Jan. 12, 2006

(30) Foreign Application Priority Data

Jun. 29, 2004 (DE) .................. 10 2004 031 394

(51) Int. Cl.
*G05F 1/652* (2006.01)
(52) U.S. Cl. ..................................... 323/222; 323/267
(58) Field of Classification Search ................ 323/222, 323/224, 223, 244, 282–290
See application file for complete search history.

(56) References Cited

U.S. PATENT DOCUMENTS 5,617,015 A   4/1997 Goder et al.
5,751,139 A   5/1998 Jordan et al.
6,369,551 B1*  4/2002 Blumenkrantz et al. .... 323/244
6,437,545 B2  8/2002 Sluijs

FOREIGN PATENT DOCUMENTS

DE   102 49 802 A1   5/2004
EP   1 067 662 A1    1/2001
WO   WO 99/61965 A1  12/1999

OTHER PUBLICATIONS

U.S. Appl. No. 11/169,457, filed Jun. 29, 2005, Kranz.

* cited by examiner

*Primary Examiner*—Rajnikant B. Patel
(74) *Attorney, Agent, or Firm*—Eschweiler & Associates, LLC (57) ABSTRACT

A DC voltage converter having a plurality of outputs and a method for converting a DC voltage into a plurality of output-side DC voltages is disclosed. A control unit is used to drive a first and a second switch to drive an energy store in such a manner that a plurality of different output voltages are provided. The switches include field effect transistors, and at least the substrate terminal of one of these field effect transistors is connected to the control unit in order to be driven using a substrate potential in a manner dependent on an operating mode of the DC voltage converter. This makes it possible to provide different voltages both in an intermittent and in a continuous operating mode of the converter with, at the same time, a high degree of efficiency.

28 Claims, 3 Drawing Sheets

DC VOLTAGE CONVERTER AND METHOD FOR CONVERTING A DC VOLTAGE

REFERENCE TO RELATED APPLICATIONS

This application claims the benefit of the priority date of German application DE 10 2004 031 394.6, filed on Jun. 29, 2004, the contents of which are herein incorporated by reference in their entirety.

FIELD OF THE INVENTION

The present invention relates to a DC voltage converter having a plurality of outputs and to a method for converting a DC voltage into a plurality of output-side DC voltages.

BACKGROUND OF THE INVENTION

DC voltage converters are normally used to convert an input-side DC voltage into an output-side DC voltage. In the case of multichannel DC voltage converters, a plurality of different DC voltages may be provided.

DC voltage converters of this type may, for example, be in the form of so-called step-up converters which belong to the group of secondary-clocked switching regulators. In this case, provision is usually made of a storage inductor (as an inductance) as the energy store and a switch, which is operated using a controllable duty ratio. A distinction is made between flyback converters and forward converters depending on the design of the secondary-clocked switching regulators.

Depending on whether or not the coil current returns to zero in the discharging phase of the step-up converter, a distinction is made between two operating modes, namely intermittent and continuous operation. In a DC voltage converter having a plurality of output branches for providing different output voltages, it is necessary, during continuous operation, to ensure that the switches can be fully switched. When designed in integrated fashion, the switches are, for example, field effect transistors.

During intermittent operation, in contrast, the coil current returns to zero in the discharging phase of the coil. In order to nevertheless achieve a useful degree of efficiency, it is necessary to prevent charge carriers from flowing back from the output of the converter to the input. Diodes are normally provided in each branch for this purpose.

The diodes are, for example, designed using integrated circuit technology.

SUMMARY OF THE INVENTION

The following presents a simplified summary in order to provide a basic understanding of one or more aspects of the invention. This summary is not an extensive overview of the invention, and is neither intended to identify key or critical elements of the invention, nor to delineate the scope thereof. Rather, the primary purpose of the summary is to present one or more concepts of the invention in a simplified form as a prelude to the more detailed description that is presented later.

The present invention is directed to a DC voltage converter and a method for converting DC voltage, which converter and method make it possible to generate a plurality of output voltages and allow both a continuous operating mode and an intermittent operating mode with a high degree of efficiency.

According to one embodiment of the invention, the DC voltage converter comprises an energy store connected to an input for supplying a DC voltage, a first output for providing a first output voltage, and a second output for providing a second output voltage. The voltage converter further comprises a first switch which couples the energy store to the first output and comprises a first field effect transistor, a second switch which couples the energy store to the second output and comprises a second field effect transistor, and a further switch, which is coupled to the energy store. In addition, the converter comprises a control unit, which is coupled, on the input side, to the first and second outputs and is coupled, on the output side, to the first switch, the second switch and the further switch in order to drive the switches. The second field effect transistor comprises a substrate terminal connected to and driven by the control unit using a substrate potential in a manner dependent on an operating mode of the DC voltage converter.

The present invention provides for a substrate potential that is dependent on the operating mode to be applied to the substrate terminal of at least one of the field effect transistors (which are used as switches) of the output branches of the DC voltage converter. This makes it possible to generate different output voltages at a plurality of outputs of the DC voltage converter and, in the process, to operate the DC voltage converter intermittently and also continuously with a respective high degree of efficiency.

The substrate terminal of a field effect transistor, which is designed using integrated circuitry, is also referred to as the bulk terminal or ground terminal.

Connecting the substrate terminal in the proposed operating-state-dependent and time-dependent manner not only makes it possible to operate a multichannel DC voltage converter intermittently and continuously, but also advantageously makes it possible to implement further operating modes such as starting operation and power-saving operation.

The substrate terminal of the second field effect transistor and, if appropriate, of further field effect transistors is in one example connected to either the first or the second output of the DC voltage converter in such a manner that it can be changed over. This makes it possible for the substrate terminal to be connected to different voltages which are available since they are generated by the DC voltage converter.

In one embodiment, in the continuous operating mode of the DC voltage converter, the substrate terminal of the second field effect transistor is connected to that output which is designed to provide the highest output voltage. Without restricting generality, this is the first output in one example.

In another embodiment the substrate terminal of the second field effect transistor is connected to the second output of the DC voltage converter in an intermittent operating mode of the DC voltage converter. During intermittent operation, the substrate terminal of the second field effect transistor can thus be connected to a terminal of the controlled path of the field effect transistor.

During continuous operation, the current from the energy store does not return to zero in a discharging phase of the energy store. The substrate terminal(s) of the field effect transistors are therefore connected to the highest output voltage. This makes it possible to individually switch the current in the individual output branches.

If, in contrast, the DC voltage converter is operating intermittently, the current that is emitted by the energy store in its discharging phase returns to zero. In order to nevertheless achieve a useful degree of efficiency, the charge carriers are prevented from flowing back from the output to the input, in one example. To this end, provision is made for the substrate terminals to be connected to a potential other than that used for continuous operation. As a result, diodes formed in the field effect transistor can be reverse-biased. Although this would also be the case whenever the substrate terminals are connected to the highest output voltage, it is necessary to perform an estimation or measurement since the control unit, which determines the switching times of the switches, cannot precisely predict the exact switching time up until the point in time at which the current of the energy store will fall to zero.

In order to prevent the charge carriers from flowing back (as described), which would considerably impair efficiency, this estimation is normally performed conservatively, that is to say rather too briefly. This means that the output switch that is currently active is turned off before the current of the energy store reaches zero. If, in this operating state, all of the substrate terminals are connected to the highest output voltage, the residual current is passed to this channel via diodes which are connected to the substrate. It is therefore no longer possible to regulate the channel having the highest output voltage. In order to prevent this in an effective manner, when the last switch is turned off, the substrate terminal of this transistor is also connected to its own output. This means that the residual current from the energy store continues to flow into this output branch and can thus be advantageously set by regulating the switching times.

In accordance with the present invention, the substrate terminal of the relevant output branch, in which the current from the energy store is estimated to be zero, is therefore not connected to the highest output voltage but rather to its own output voltage. This may be carried out in each pulse period.

The first and second field effect transistors may each comprise two diodes whose cathodes are directly connected to one another and to the substrate terminal of that field effect transistor. The anode terminals of the diodes are connected to the terminals of the controlled path of the respective field effect transistor.

On account of the physical construction of the field effect transistor, the diodes may be designed using integrated circuitry. In the case of a p-channel field effect transistor, for example, in which the drain and source are in the form of p+-type regions in an n-type well, the n-type well forms the bulk terminal. There is then a pn junction from the drain to the bulk and a pn junction from the source to the bulk.

In addition to the diodes which are formed in the field effect transistor, further integrated diodes may be provided in order to improve efficiency. These additional diodes are preferably forward-biased. These additional diodes are preferably in the form of Schottky diodes.

Provision is made in one example of a switch-on operating mode, in which the substrate terminal of the second field effect transistor is connected to the first output.

Provision is made in another example of a power-saving operating mode, in which the substrate terminal of the second field effect transistor is connected to the second output. The power-saving operating mode may also be referred to as the idle mode or quiescent state. It is characteristic of this operating mode that output voltages do not need to be provided at all of the outputs but rather that which matters is that the arrangement has a low power consumption.

The DC voltage converter may have more than two outputs. A third output or yet further outputs is/are thus provided in one example for the purpose of providing a third output voltage or yet further output voltages. Each further output is associated with a further switch, which couples the energy store to the respective further output and comprises a respective further field effect transistor. Each of these further field effect transistors has a substrate terminal, which is connected either to the respective output of the field effect transistor or to the first output in such a manner that it can be changed over using a switch. As a result, the substrate potential of these further field effect transistors is also driven in a manner dependent on the operating mode of the DC voltage converter. This operation of driving in a manner dependent on intermittent or continuous operation may be carried out in exactly the same manner as already described for the second field effect transistor.

In order to regulate the output voltages, in one example the DC voltage converter has a threshold value comparator, which couples the second output to the second switch via a control block. In this example the control unit comprises a control loop having a regulator, which couples the first output to the further switch. In this case, the control block is connected not only to the second switch but also to the first switch and any further switches (which may be present) in order to drive them.

If a third output or further outputs is/are provided, it/they is/are likewise associated with a respective further threshold value comparator. In this case, the threshold value comparators couple the third output or further outputs to the control block.

In one embodiment the control block comprises means for evaluating threshold value comparisons and means for driving the first and second switches and any further switches which may be present.

The regulator comprises in one embodiment a means for changing over in such a manner that either the first or the second output is coupled to the further switch. This multiplexing advantageously makes it possible to cyclically exchange that voltage output whose output voltage is actually subjected to real regulation. A respective threshold value comparison is carried out in respect of the other output voltages.

In one example the control loop comprises a pulse width modulator, which couples the regulator to the further switch in order to drive it. The periodic charging and discharging behavior of the energy store is thus controlled. The DC voltages are produced at the outputs in a manner dependent on the behavior and on the likewise periodic switching behavior in the output branches.

Provision is also preferably made of an analog/digital converter, which is connected upstream of the regulator in the control loop and is connected, on the input side, to the outputs of the DC voltage converter.

The energy store is an inductance in one example. This inductance is also referred to as a storage inductor. In this case, the energy store is jointly provided for all of the output branches of the DC voltage converter.

A respective charge store is preferably connected to each output of the DC voltage converter.

The charge store in one example comprises a capacitor. In accordance with its function, this capacitor is also referred to as a smoothing capacitor.

The DC voltage converter comprises in one embodiment a step-up voltage converter, which converts a DC voltage that is applied on the input side into a plurality of DC voltages which are provided at the outputs. In this case, the DC voltages which are provided at the outputs may be different. In the case of a step-up voltage converter, it is possible to generate output-side DC voltages which may be higher than the input voltage.

The present invention also includes a method for converting a DC voltage into a plurality of output-side DC voltages, and comprises supplying a DC voltage to an input, and using the DC voltage to charge an energy store. A first output voltage is provided at a first output in a manner dependent on the switch position of a first switch and on the state of charge of the energy store, and a second output voltage is provided at a second output in a manner dependent on the switch position of a second switch and on the state of charge of the energy store. A substrate potential is provided in a manner dependent on a selected operating mode, and the substrate potential is used to drive the substrate terminal of a field effect transistor in the second switch.

As regards the advantageous functioning of the method in accordance with the present invention, reference is also made to the explanation of the functioning of the DC voltage converter. The substrate terminal of the field effect transistor in the second switch in one example is connected either to the first output or to the second output.

In a continuous operating mode, the substrate terminal of the field effect transistor in the second switch is connected to that output which is designed to provide the highest of the output voltages. In contrast, in an intermittent operating mode, the substrate terminal of the field effect transistor in the second switch is connected to the second output.

In one embodiment the charging operation of the energy store is regulated in a manner dependent on at least the first output voltage. The second output voltage is used to carry out a threshold value comparison with a threshold value that can be set, and the first and second switches are driven in a manner dependent on the comparison result.

A first charge store, which in one example is connected to the first output, is charged in a manner dependent on the switch position of the first switch and on the state of charge of the energy store. A second charge store, which is connected to the second output, is charged in a manner dependent on the switch position of the second switch and on the state of charge of the energy store.

The first charge store and the second charge store are each charged from the energy store in a temporally separate manner in one example. The charging operating modes of the first and second charge stores, in the discharging operating mode of the energy store, are temporally separate from a charging operating mode of the energy store, in which the latter is charged.

The first output voltage and the second output voltage in one example are alternately used as a reference variable for a control loop, a charging operation of the energy store being controlled in this regulating operation. In this case, the respective output voltage that is not used directly as a reference variable for the control loop is used to carry out a threshold value comparison, the output voltage at at least this output being influenced in a manner dependent on said threshold value comparison.

In a switch-on operating mode (start-up mode), the substrate terminal of the field effect transistor in the second switch is connected to the first output.

In a power-saving operating mode, the substrate terminal of the field effect transistor in the second switch is connected to the second output.

To the accomplishment of the foregoing and related ends, the invention comprises the features hereinafter fully described and particularly pointed out in the claims. The following description and the annexed drawings set forth in detail certain illustrative aspects and implementations of the invention. These are indicative, however, of but a few of the various ways in which the principles of the invention may be employed. Other objects, advantages and novel features of the invention will become apparent from the following detailed description of the invention when considered in conjunction with the drawings.

BRIEF DESCRIPTION OF THE DRAWINGS

The invention is explained in more detail below using a plurality of exemplary embodiments and with reference to drawings, in which.

DETAILED DESCRIPTION OF THE INVENTION

Figure 1:
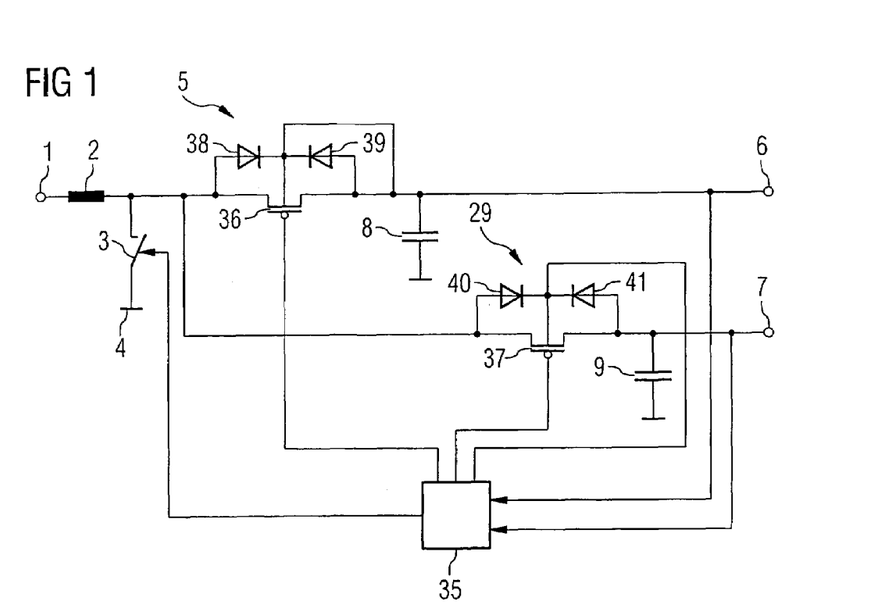
FIG. 1 is a schematic diagram illustrating a first exemplary embodiment of a DC voltage converter in accordance with the present invention.

FIG. 1 shows a DC voltage converter having an input 1, to which a terminal of an energy store 2 (which is in the form of a coil) is connected. The free terminal of the energy store 2 is coupled to a first output 6 via a first switch 5 and to a second output 7 via a second switch 29. The first output 6 and the second output 7 are connected to a reference potential terminal 4 via a respective charge store 8, 9 that is in the form of a backup capacitor. A respective switch 5, 29 having a downstream backup capacitor 8, 9 forms a respective output branch of the DC voltage converter. A further switch 3 is connected to the reference potential terminal 4 in order to control the charging operation of the energy store 2 at its terminal that is connected to the output branches 5, 8; 29, 9.

The first switch 5 and the second switch 29 each comprise a field effect transistor of the p-channel conductivity type 36, 37 each having two diodes 38, 39; 40, 41. The respective field effect transistor 36, 37 is respectively connected, by way of the terminals of its controlled path, between the energy store 2 and the associated output 6, 7. The cathode terminals of the two diodes 38, 39; 40, 41 are respectively directly connected to one another and to the substrate terminal of the associated field effect transistor 36, 37. The anode terminals of the diodes 38, 39 are connected to a respective terminal of the controlled path of the respective field effect transistor 36, 37. The substrate terminal of the first field effect transistor 36 is connected to the output 6. The substrate terminal of the second field effect transistor 37 is connected to a control unit 35 for the purpose of providing a substrate potential that can be set. Inputs of the control unit 35 are connected to the first output 6 and the second output 7. Further control outputs of the control unit 35 are connected to the gate terminals of the field effect transistors 36, 37 and to a control input of the further switch 3.

In accordance with the present invention, a plurality of field effect transistors 36, 37 (of the p-channel type in the present case) are provided in a DC voltage converter having a plurality of output branches and having a coil as the charge store. In accordance with the invention, the field effect transistors 36, 37 have a substrate terminal. In the present case, the two diodes 38, 39 are connected to this substrate terminal. Connecting the substrate terminal of at least the second field effect transistor 37 advantageously makes it possible to implement various operating modes, namely intermittent operation, continuous operation, starting operation and power-saving operation.

In accordance with the present invention, the substrate terminal of the second transistor 37 is therefore connected in a manner dependent on the operating state and time.

During continuous operation, the proposed DC voltage converter generates different output voltages at the two outputs 6, 7. During continuous operation, the coil current does not return to zero in the discharging phase of the coil. In this case, all of the substrate terminals are connected to the highest output voltage, which, in the present case, is provided at the output 6. The current can thus be individually switched in the individual output branches 5, 8; 29, 9.

In contrast, during intermittent operation, the coil current returns to zero in the discharging phase of the coil. In this case, it must be ensured that the charge carriers are prevented from flowing back from the outputs 6, 7 into a voltage source that is connected to the input 1, in order to achieve a high degree of efficiency. This means that the diodes (which are connected to the substrate) of all of the field effect transistors or switches must be reverse-biased. This is achieved by connecting all of the substrate terminals of the switching field effect transistors to the highest output voltage at the output 6. In order to be able to additionally ensure independent voltage regulation, the substrate terminal of the relevant switch of the active output branch, in which the coil current is estimated to be zero, is not connected to the highest output voltage but rather to its own output voltage. This must be carried out in every pulse period. This avoids the problem of it not being possible to accurately predict, in the control device 35, when the coil current will fall to zero. In order to nevertheless reliably prevent charge carriers from flowing back from the output to the input, the estimation is performed conservatively. This means that the switching transistor of the channel that is currently active would be turned off before the coil current reached zero. If all of the substrate terminals were connected to the highest output voltage, the residual current would be passed to this channel via the bulk diodes. It would no longer be possible to regulate the channel having the highest voltage. In order to prevent this, when the last switching transistor is turned off, the substrate terminal of this transistor is also connected to its own output in the present case.

It is thus ensured that the output voltages can be regulated independently of one another, independently of the intermittent or continuous operating mode and such that the arrangement has a high degree of efficiency.

On account of the field effect transistors being designed using integrated circuitry, the diodes 38 to 41 are formed, in the present case, between the drain or source and the bulk. In particular, the forward-biased diodes 38, 40 may, however, be supplemented by additionally integrated diodes which contribute to improving the efficiency further. These diodes are advantageously in the form of Schottky diodes.

Figure 2:
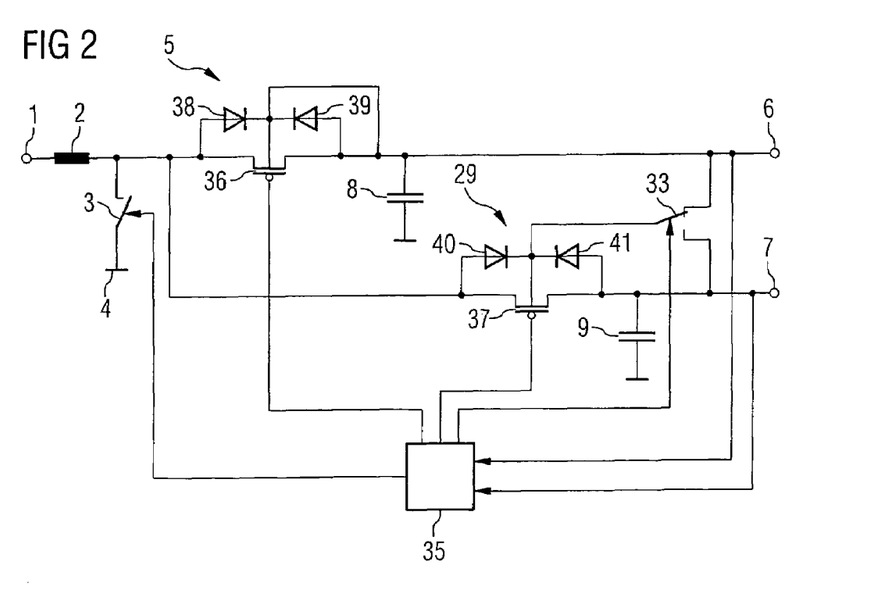
FIG. 2 is a schematic diagram illustrating a second exemplary embodiment of a DC voltage converter in accordance with the present invention.

FIG. 2 shows a development of the circuit of FIG. 1, which differs from the latter only by virtue of the fact that the substrate terminal of the second field effect transistor 37 is not directly connected to the control device 35 but rather, via a switch 33, to the output 6 or the output 7 depending on the switch position. On account of the exemplary embodiments coinciding to a considerable extent, reference is made to the description of FIG. 1 (which shall not be repeated at this juncture) as regards the explanation of the components used, their advantageous interconnection and method of operation.

Figure 3:
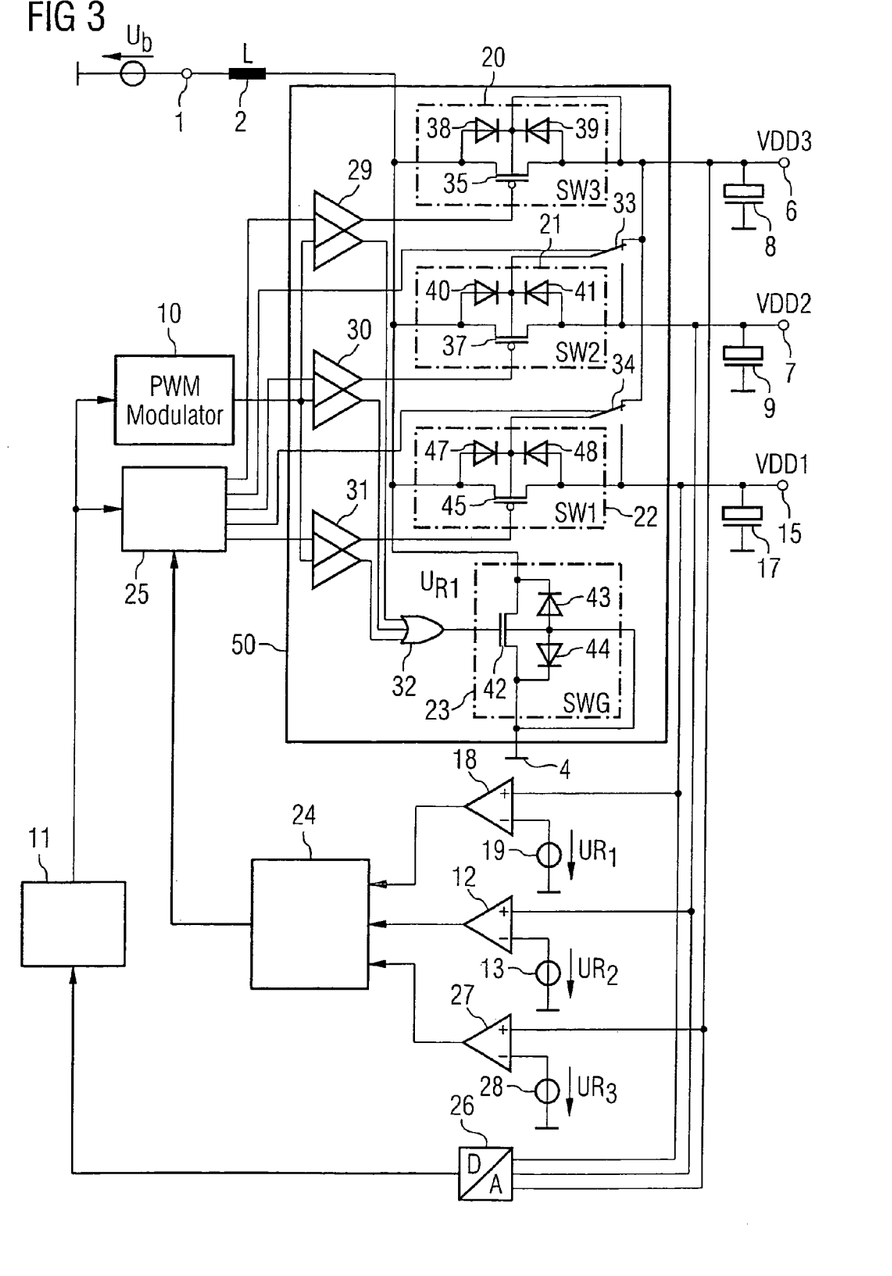
FIG. 3 is a schematic diagram illustrating a third exemplary embodiment of a DC voltage converter in accordance with the present invention.

FIG. 3 uses a DC voltage converter having three outputs 6, 7, 15 to show an exemplary embodiment of the invention. An input 1 for supplying a DC voltage is provided, an energy store 2 in the form of a coil being connected to the input. The free terminal of the energy store 2 is connected to a reference potential terminal 4 via a switch 23. The circuit node that is formed between the energy store 2 and the switch 23 is furthermore connected to a first output 6 via a first switch 20, to a second output 7 via a second switch 21 and to a third output 15 via a third switch 22. The first, second and third outputs 6, 7, 15 are each designed to provide an output voltage in the form of a DC voltage. The first, second and third outputs 6, 7, 15 are connected to the reference potential terminal 4 via a respective charge store 8, 9, 17 that is in the form of a capacitor.

Provision is also made of a control loop, which comprises a regulator 11 and couples the first output 6 to a common means for influencing the voltage magnitude 23, 10. The common means for influencing the voltage magnitude comprises a modulator 10 and the switch 23 (already described). In the present case, the modulator is in the form of a pulse width modulator. A threshold value comparator 12 is connected, by way of a non-inverting input, to the second output 7 and, by way of an inverting input, to a voltage source 13, which provides a threshold value that can be set. The output of the threshold value comparator 12 is connected to respective control inputs of the first and second switches 5, 29 via a control block 24, 25.

The energy store 2 is regularly charged with a current which is provided by a voltage source that is connected to the input 1. A discharging current of the energy store 2 is distributed to the three output branches 20, 8; 21; 9; 22, 17 which each comprise a switch and a charge store. In this case, the portion of current per branch is set in such a manner that the output voltage at the output 6, 7, 15 of this branch remains virtually constant. In this case, the respective portion of current provides the instantaneous output current, that is to say load current, and additionally charges the respective backup capacitor 8, 9, 17. The backup capacitor 8, 9, 17 supplies an electrical load (which is connected to the outputs 6, 7, 15) in that period of time in which a current from the energy store 2 is not immediately available. The threshold value comparator 12 and the control block 24, 25 are used to set the voltage at the output 7 via a threshold value controller. In this case, an output branch 21, 9 is charged from the energy store 2 until the desired value of the output voltage is reached at the output 7 (detected using the threshold value comparator 12). If the output voltage at the output 7 exceeds the threshold value provided by the threshold value voltage source 13, the control block 24, 25 changes over to one of the other output branches 20; 8; 22, 17. A discharging current of the energy store 12 is thus applied to all of the output branches in succession.

The output 6 is connected to a control loop. The regulator 11 detects a deviation of the actual output voltage at the output 6 from a desired value and provides an output voltage error (obtained therefrom) as a reference variable for the control loop. If insufficient current for keeping the output voltage at the output 6 constant is available for the output 6, the current provided by the energy store 2 must be increased; if, conversely, the output voltage has exceeded the desired value, the current provided by the energy store 2 is too large. It goes without saying that the current that remains for the first output 6 is not only dependent on the electrical load at this output but also on the electrical loads at the other outputs. This means that the output voltages at the other outputs 7, 15 are also concomitantly regulated by adjusting the voltage at the first output 6.

The switches 20, 21, 22 are driven in such a manner that the outputs 6, 7, 15 are not simultaneously connected to the energy store 2.

Analogously to the second output 7, the third output 15 is connected to the non-inverting input of a further threshold value comparator 18 whose inverting input is connected to the reference potential terminal 4 via a voltage source 19. The voltage source 19 provides a second threshold value. The output of the further threshold value comparator 18 is connected to the control block 24, 25. In addition to the first and second switches 20, 21, the control block 25 also drives the third switch 22.

The circuit of FIG. 3 indicates that, at a particular point in time, the voltage magnitude of all of the outputs 7, 15, except for one output, is set via a threshold value controller 12, 13; 18, 19. Only the output 6 has a real regulating function as regards the output voltage, the switch 23 being used to implement said regulating function via the regulator 11 and the modulator 10.

The switches 20, 21, 22 each comprise a metal oxide semiconductor (MOS) field effect transistor of the p-channel type 36, 37, 45 whose gate terminal respectively forms the control input of the switch 20, 21, 22. The terminals of the controlled paths of the p-channel transistors 36, 37, 45 form the load terminals of the switches. These load terminals are also connected to a respective anode terminal of a respective diode 38, 39; 40, 41; 47, 48, the cathode terminals of which diodes are connected to one another and to the respective output of the DC voltage converter. The switch 23 also comprises a MOS field effect transistor 42 having two diodes 43, 44, provision being made, in this case, of an n-channel field effect transistor 42 whose terminals of the controlled path form the load terminals of the switch 23 and are connected to a respective cathode terminal of a respective diode 43, 44, the anode terminals of which diodes are connected to one another and to the reference potential terminal 4. The gate terminal of the switch 23 is connected to a pulse width modulator 10 that is part of the control loop.

Each output 6, 7, 15 is connected to the regulator 11, via an analog/digital converter 26 in the present case. The regulator 11 drives the pulse width modulator 10. In this example, however, a multiplexing function is provided in the regulator 11 such that, at a particular point in time, only one of the three outputs 6, 7, 15 is ever coupled to the pulse width modulator 10. In addition, provision is also made of yet another threshold value comparator 27 whose non-inverting input is connected to the first output 6 and whose inverting input is connected to the reference potential terminal 4 via a voltage source 28. The voltage source 28 provides a threshold value that can be set. The outputs of all of the threshold value comparators 12, 18, 27 are connected to a function block 24, which is designed to change over between the channels and to select the channels. The terms channel and output branch are synonymous. The function block 24 is coupled to an output branch controller 25, which, in turn, is connected to the gate terminals of the transistors of the three switches 20, 21, 22. A synchronization input of the output branch controller 25 is connected to the regulator 11. The function block 24 and the output branch controller 25 together form the control block 24, 25.

The circuit of FIG. 3 makes it possible to cyclically interchange the functions of the outputs 6, 7, 15. This means that an output voltage error at the first output 6 is used for regulating purposes in a first phase, the error of the second output 7 is used in a second phase and the error at the output 15 is used in a third phase.

This ensures that each output voltage is alternately adjusted. This means that it is irrelevant which of the outputs is electrically loaded, and no convergence problems can arise either. Selection of the outputs 6, 7, 15 for the purpose of providing a reference variable for the control loop can either change periodically (as described) or weighted sorting can be carried out on the basis of the output load. This means that that output which currently requires the largest portion of current always provides the reference variable. In one example the pulse width of the respective output channel is to be used as the criterion. If, for example, the first output branch 8, 20 has a pulse width of 13%, the second output branch 9, 21 has a pulse width of 4% and the third channel 17, 22 has a pulse width of 7%, a switching sequence from the second to the third to the first output 7, 15, 6 results for the outputs.

In another alternative method of operation, that output 6, 7, 15 which currently has the widest pulse width at the time is respectively used to provide the reference variable. This reduces the number of changeover operations and thus also the noise in the output voltages at the outputs 6, 7, 15.

In the present embodiment, a multiplicity of driver stages 29, 30, 31 and a logic gate 32 are provided for the purpose of driving the switches 20, 21, 22, 23. Said driver stages and logic gate are used to couple the switching signals which are provided by the pulse width modulator 10 and by the output branch controller 25 to one another. The driver stages 29, 30, 31 are thus double driver stages which each have a first and a second input and a first and a second output. The first inputs of the driver stages 29 to 31 are each connected to outputs of the branch controller 25, while the second inputs are connected to the output of the pulse width modulator 10. The first outputs of the driver stages 29 to 31 are connected to respective gate terminals of the switches 20 to 22, while the second outputs are combined with one another in the AND module 32 whose output is connected to the gate terminal of the switch 23. This is used to comply with overlap-free times.

Provision is also made of two further switches 33, 34 which are each driven by the branch controller 25. The switches 33, 34 optionally connect the common cathode terminal of the second and third switches 21, 22 to the first output 6 or to the second or third output 7, 15. This is used to change over between various operating modes of the DC voltage converter (which is operated in a clocked manner) by applying different substrate potentials to the substrate terminals, as already explained above.

In the circuit of FIG. 3, a respective threshold value comparator 18, 12, 27 is used to monitor the voltage at each output 6, 7, 15. The threshold value comparators are used to ascertain whether the output voltage at the outputs 6, 7, 15 is greater than or less than a prescribable reference value. The function block 24 selects the relevant output using the decisions of the threshold value comparators and a selection criterion for the next channel. The outputs are switched through only during a discharging operating mode of the energy store 2 and not during its charging phase. That output which had the largest charging current or the widest pulse width in the preceding period is selected as that channel at whose output the reference variable for the control loop is provided. It therefore swaps the temporal position with that output channel which provided the reference variable in the preceding period. The analog/digital converter 26 is used to measure the output voltage error at the selected output and to feed it to the regulator 11. This regulator 11 changes the pulse width for the charging phase of the energy store in such a manner that the output voltage error is as small as possible at the selected channel that provides the reference variable. In this case, the regulation coefficients may be dependent on the channel.

In summary, the present invention affords a high degree of efficiency, little crossover influence between the output voltages, little noise and low costs when produced as an integrated circuit. In addition, driving the substrate potential in a manner dependent on time and on the operating mode during intermittent and continuous operation makes it possible to set the voltages between the outputs in different ways and facilitates an improved degree of efficiency in both operating modes.

It goes without saying that, in alternative embodiments, it is also within the scope of the present invention to provide further output voltages by extending the circuit in an appropriate manner. In this case, it is in keeping with the proposed principle to set n−1 of n outputs via a threshold value controller and to operate precisely one of the n outputs using voltage regulation. Since the control block 24, 25 is used to change over to a respective other output branch as soon as the preset voltage threshold value is exceeded, voltage regulation of the other outputs is also ensured by direct voltage regulation of the first output.

Figure 4:
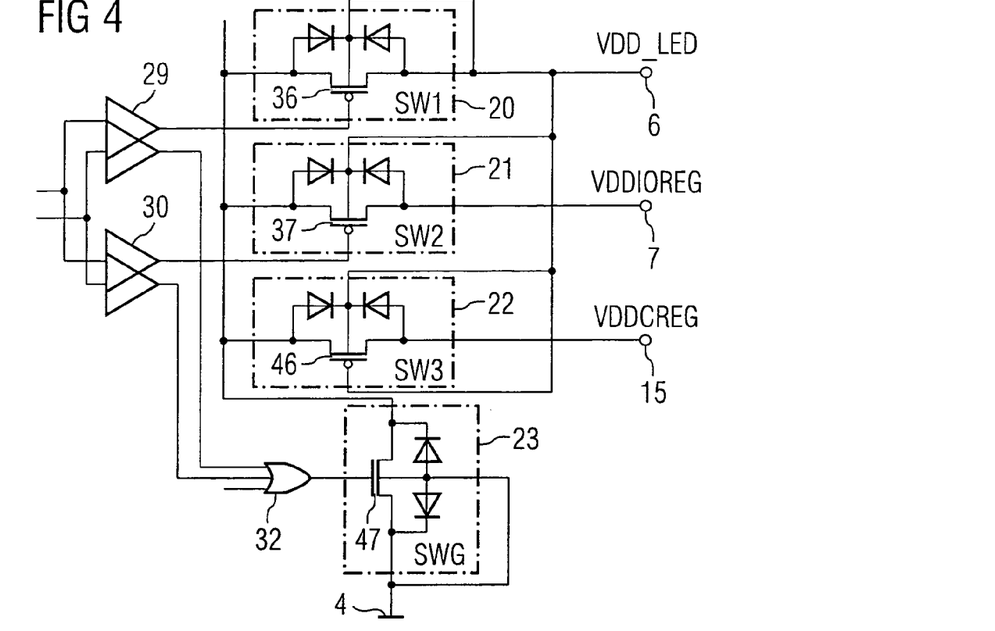
FIG. 4 is a schematic diagram illustrating the connection of the substrate terminals of the switches of FIG. 3 in a switch-on operating mode.

FIG. 4 shows the switch position of the switches 33, 34 and the connection of the gate terminals of the field effect transistors 36, 37, 46, 47 for a switch-on operating mode rather than for the active operating states of the DC voltage converter (as in FIG. 3). FIG. 4 corresponds largely to FIG. 3 and the description thereof is therefore not repeated at this juncture. In contrast to FIG. 3, however, the gate terminal of the third field effect transistor 46 in the third switch 22 is not driven by a control device via a driver 31 but rather is directly connected to the first output 6 in FIG. 4. The substrate terminals of the first, second and third field effect transistors 36, 37, 46 are also connected to the first output 6.

During the switch-on operation, the supply voltage is still so low that a complex regulating algorithm (as in FIG. 3) and the clock supply are not yet available. In this operating mode, the supply voltage for the converter is therefore first of all generated using an auxiliary circuit (not depicted), the supply voltage actually being provided, in the present case, at the second output 7, namely VDDIOREG. In this case, it is ensured that the other voltages remain within permitted limits. By way of example, the voltage at the second output must be 2.2 V, while the voltage at the third output VDDCREG should not exceed 1.8 V. The highest voltage that is generated in the present case, namely VDD_LED at the first output 6, is not connected, in the present case, to the converter's supply and is not used for the switch-on operation. This is achieved by virtue of the fact that the substrate terminals of all of the field effect transistors 36, 37, 46 of the three switches 20, 21, 22 in the output branches are connected, in the present case, to the highest voltage, namely VDD_LED, and by virtue of the fact that actively driving the two channels 20, 21 used prevents the third voltage from exceeding 1.8 V.

Figure 5:
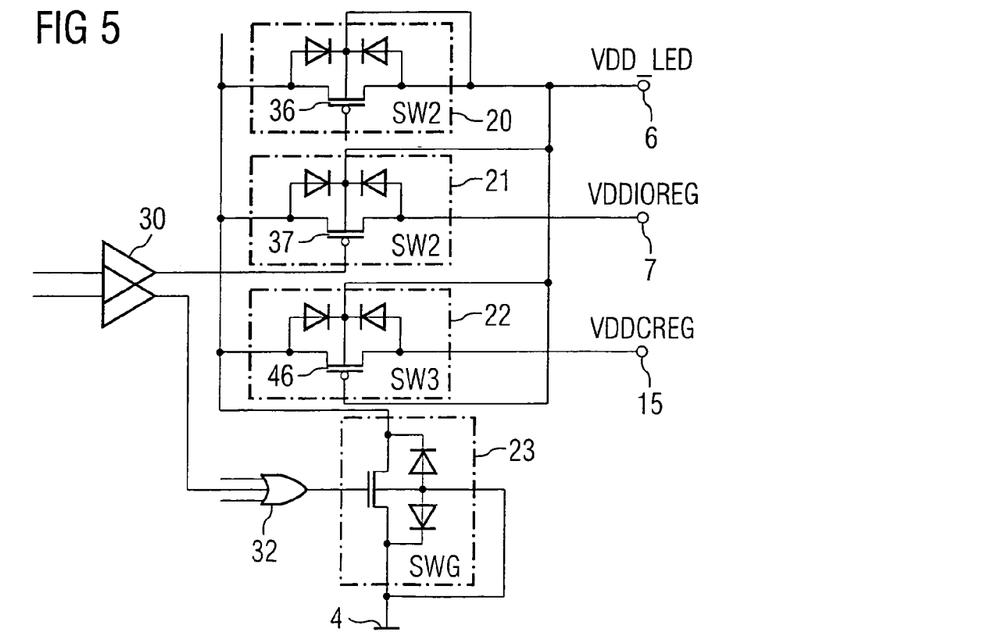
FIG. 5 is a schematic diagram illustrating the connection of the substrate terminals of the switches of FIG. 3 in a power-saving operating mode.

FIG. 5 shows the connection of the components within the block 50 of FIG. 3 in a power-saving operating mode rather than in an active operating mode. The circuit of FIG. 5 corresponds largely to that of FIG. 3 and the description thereof is therefore not repeated at this juncture. In contrast thereto, provision is made, in FIG. 5, for the gate terminals of the first and third field effect transistors 36, 46 to be connected to the first output 6. The substrate terminals of the first and third field effect transistors 36, 46 are likewise connected to the first output 6. As in FIG. 3, the control terminal of the second field effect transistor 37 is controlled by the driver stage 30. The substrate terminal of the second field effect transistor 37 is connected to the controlled path of the latter and to the second output 7.

In the power-saving operating mode shown in FIG. 5, only the supply voltage at the output 7 is required and only this supply voltage is therefore generated. The substrate terminals of the first and third field effect transistors 36, 46 are connected to the voltage at the first output 6 and the substrate terminal of the second field effect transistor 37 is connected to its own output 7. In this operating mode, the substrate terminal controller therefore insulates the second output 7 from the other outputs, and only the voltage at the second output 7 is generated. For the rest, in the circuit of FIG. 5, use is not made of the regulating algorithm of FIG. 3 but rather of the same circuit as is also used in the switch-on operating mode shown in FIG. 4.

In summary, driving the substrate terminals in the proposed manner makes it possible to insulate the required output 7 from the other outputs 6, 15.

While the invention has been illustrated and described with respect to one or more implementations, alterations and/or modifications may be made to the illustrated examples without departing from the spirit and scope of the appended claims. In particular regard to the various functions performed by the above described components or structures (assemblies, devices, circuits, systems, etc.), the terms (including a reference to a "means") used to describe such components are intended to correspond, unless otherwise indicated, to any component or structure which performs the specified function of the described component (e.g., that is functionally equivalent), even though not structurally equivalent to the disclosed structure which performs the function in the herein illustrated exemplary implementations of the invention. In addition, while a particular feature of the invention may have been disclosed with respect to only one of several implementations, such feature may be combined with one or more other features of the other implementations as may be desired and advantageous for any given or particular application. Furthermore, to the extent that the terms "including", "includes", "having", "has", "with", or variants thereof are used in either the detailed description and the claims, such terms are intended to be inclusive in a manner similar to the term "comprising".

The invention claimed is:

1. A DC voltage converter, comprising:
   an energy store coupled to an input and configured to supply a DC voltage;
   a first output configured to provide a first output voltage;
   a second output configured to provide a second output voltage;
   a first switch configured to selectively couple the energy store to the first output, the first switch comprising a first field effect transistor;
   a second switch configured to selectively couple the energy store to the second output, the second switch comprising a second field effect transistor;
   a further switch coupled to the energy store; and
   a control unit configured to receive signals at the first and second outputs, and coupled to the first switch, the second switch, and the further switch;
   wherein the second field effect transistor comprises a substrate terminal coupled to the control unit, and wherein the control unit is configured to provide a substrate potential to the substrate terminal that is dependent on an operating mode of the DC voltage converter.

2. The DC voltage converter of claim 1, wherein the control unit is further configured to coupled the substrate terminal to the first output or the second output based on the operating mode of the DC converter.

3. The DC voltage converter of claim 2, wherein, in a continuous operating mode of the DC voltage converter, the substrate terminal of the second field effect transistor is connected to the first output, wherein the first output is configured to provide the highest of the output voltages, and wherein, in an intermittent operating mode of the DC voltage converter, the substrate terminal of the second field effect transistor is connected to the second output of the DC voltage converter.

4. The DC voltage converter of claim 1, further comprising two diodes associated with each of the first and second field effect transistors, wherein cathodes thereof are directly connected to one another and to the substrate terminal of the respective field effect transistor, and comprising anode terminals connected to terminals of a controlled path of the respective field effect transistor.

5. The DC voltage converter of claim 1, further comprising two diodes associated with the further switch, wherein anodes thereof are directly connected to one another and to a substrate terminal of the further field effect transistor, and comprising cathode terminals connected to terminals of a controlled path of the further field effect transistor.

6. The DC voltage converter of claim 1, wherein the substrate terminal of the second field effect transistor is connected to the first output in a switch-on operating mode.

7. The DC voltage converter of claim 1, wherein the substrate terminal of the second field effect transistor is connected to the second output in a power-saving operating mode.

8. The DC voltage converter of claim 1, further comprising:
a third output configured to provide a third output voltage; and
a third switch coupled to selectively couple the energy store to the third output, the third switch comprising a third field effect transistor, the third field effect transistor comprising a substrate terminal selectively coupled to the first or third output based on the operating mode of the DC voltage converter.

9. The DC voltage converter of claim 8, wherein the control unit comprises a threshold value comparator configured to selectively couple the second output to the second switch via a control block, and wherein the control unit comprises a control loop comprising a regulator that is configured to couple the first output to the further switch.

10. The DC voltage converter of claim 9, further comprising a further threshold value comparator associated with the third output, and configured to selectively couple the third output to the control block.

11. The DC voltage converter of claim 9, wherein the control block comprises means for evaluating threshold value comparisons, and means for driving the first and second switches in response thereto.

12. The DC voltage converter of claim 9, wherein the regulator comprises a switching circuit configured to selectively couple either the first output or the second output to the further switch.

13. The DC voltage converter of claim 9, wherein the control loop comprises a pulse width modulator that couples the regulator to the further switch.

14. The DC voltage converter of claim 9, wherein the control loop comprises an analog/digital converter connected upstream of the regulator.

15. The DC voltage converter of claim 1, wherein the energy store comprises an inductance.

16. The DC voltage converter of claim 1, wherein a charge store is coupled to each output of the DC voltage converter.

17. The DC voltage converter of claim 16, wherein the charge stores comprise capacitors.

18. The DC voltage converter of claim 1, wherein the DC voltage converter comprises a step-up voltage converter, which converts a DC voltage that is applied at the input into a plurality of different DC voltages at the respective outputs.

19. A method for converting a DC voltage into a plurality of output-side DC voltages, comprising:
supplying a DC voltage to an input;
using the DC voltage to charge an energy store;
providing a first output voltage at a first output in a manner dependent on a switch position of a first switch and on a state of charge of the energy store;
providing a second output voltage at a second output in a manner dependent on a switch position of a second switch and on a state of charge of the energy store;
providing a substrate potential that is a function of an operating mode of the DC voltage converter; and
using the substrate potential to drive a substrate terminal of a field effect transistor in the second switch.

20. The method of claim 19, wherein providing the substrate potential comprises connecting a substrate terminal of the field effect transistor in the second switch to the first or second output based on the operating mode.

21. The method of claim 19, wherein providing the substrate potential comprises:
connecting, in a continuous operating mode, the substrate terminal of the field effect transistor in the second switch to an output configured to provide the highest of the output voltages; and
connecting, in an intermittent operating mode, the substrate terminal of the field effect transistor in the second switch to the second output.

22. The method of claim 19, further comprising:
regulating a charging operation of the energy store in a manner dependent on the first output voltage; and
carrying out a threshold value comparison with the second output voltage and driving the first and second switches in a manner dependent on the comparison result.

23. The method of claim 19, further comprising:
charging a first charge store at the first output in a manner dependent on a switch position of the first switch and on a state of charge of the energy store; and
charging a second charge store at the second output in a manner dependent on a switch position of the second switch and on a state of charge of the energy store.

24. The method of claim 23, further comprising charging the first charge store and charging the second charge store in a respective discharging operating mode, wherein the discharging operating modes of the first and second charge stores are temporally separate from charging the energy store in a charging operating mode.

25. The method of claim 19, comprising using pulse width modulation to charge the energy store.

26. The method of claim 19, further comprising regulating a charging operation of the energy store in a periodically alternating fashion in a manner dependent on the first output voltage in a control loop and on the second output voltage in the control loop, wherein a threshold value comparison is carried out with respect to an output voltage, and wherein the output voltage at the respective output is influenced in a manner dependent on the threshold value comparison.

27. The method of claim 19, further comprising connecting the substrate terminal of the field effect transistor in the second switch to the first output in a switch-on operating mode.

28. The method of claim 19, further comprising connecting the substrate terminal of the field effect transistor in the second switch to the second output in a power-saving operating mode.

* * * * *